Oct. 14, 1941.   H. S. GATES   2,259,305
SWITCH OPERATING MECHANISM
Filed July 20, 1940    3 Sheets-Sheet 1

WITNESSES:

INVENTOR
Henry S. Gates.
BY
Franklin E. Hardy
ATTORNEY

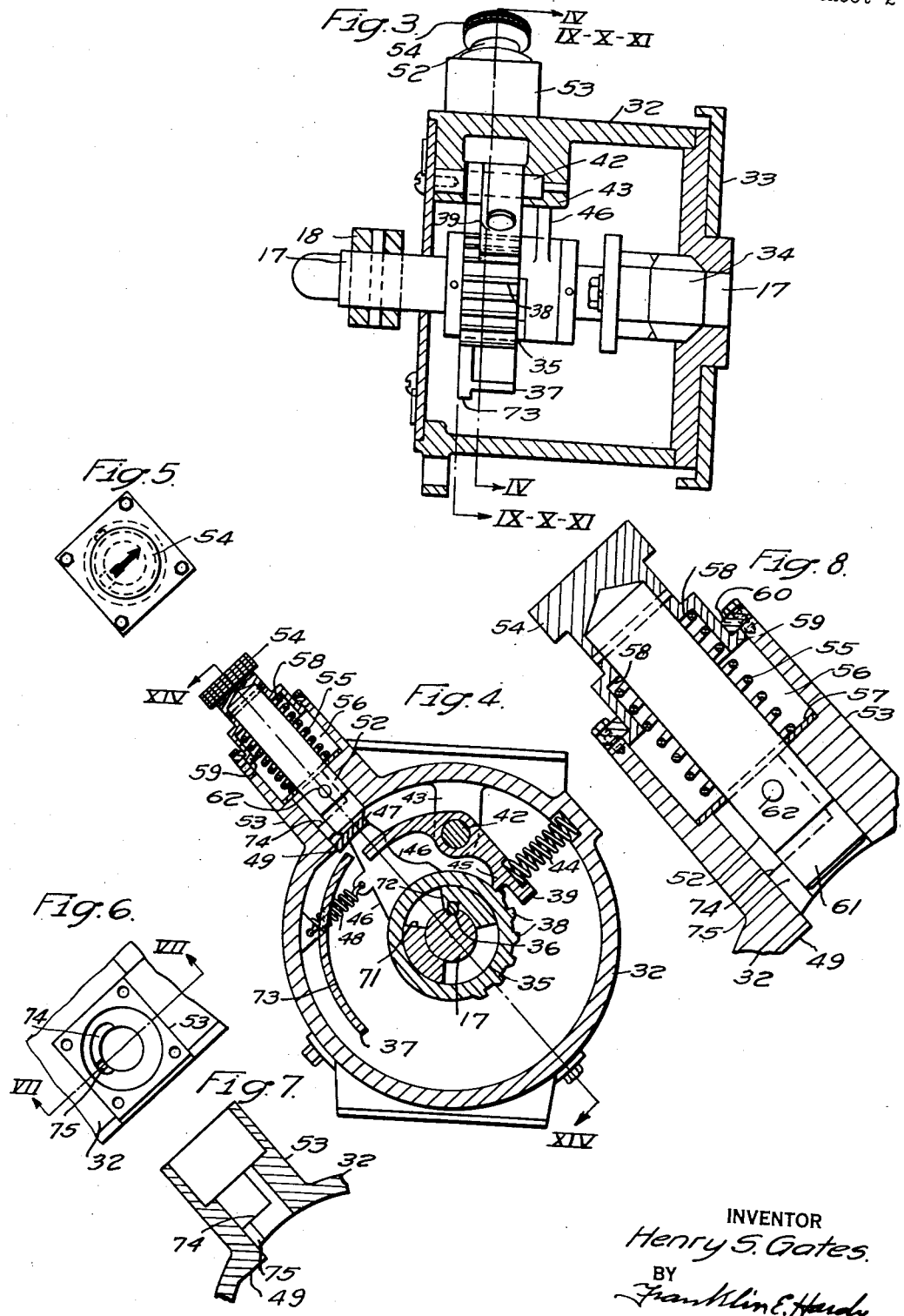

Oct. 14, 1941.                H. S. GATES                 2,259,305
                       SWITCH OPERATING MECHANISM
                         Filed July 20, 1940           3 Sheets-Sheet 3
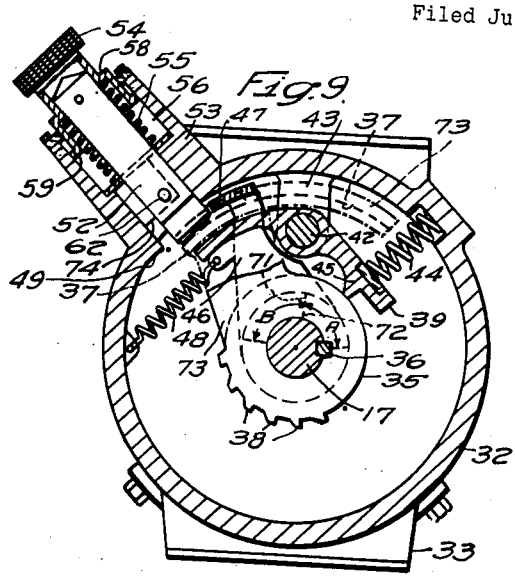
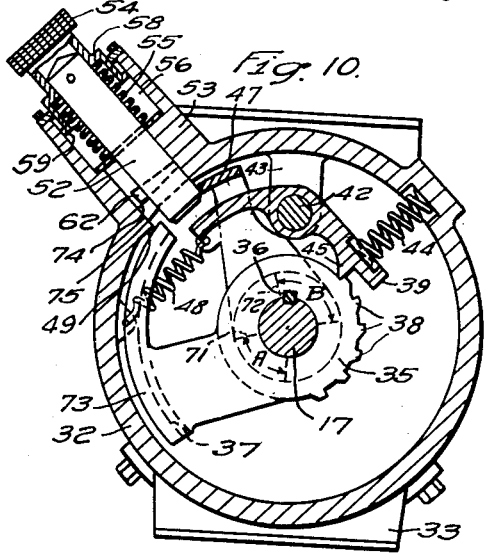
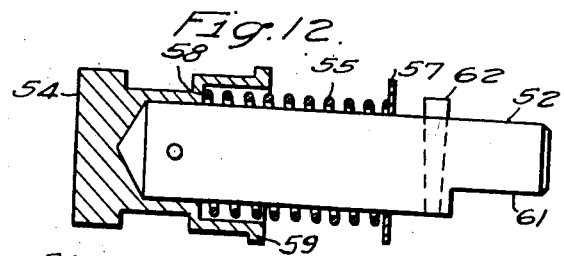
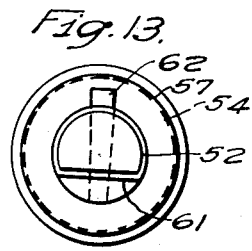
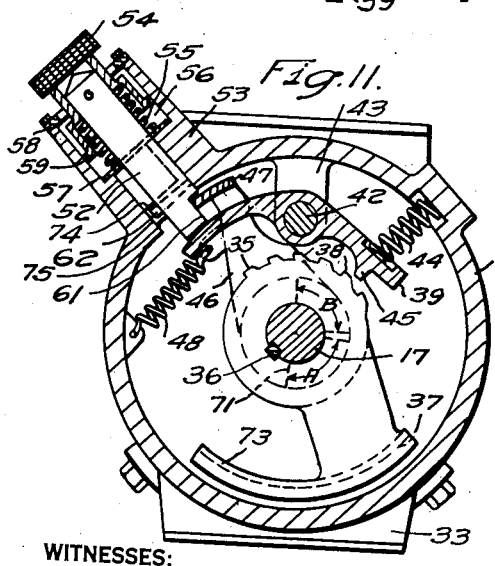
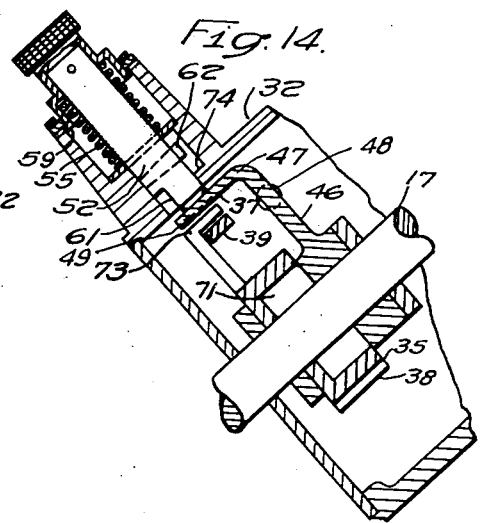
WITNESSES:
INVENTOR
Henry S. Gates.
BY
Franklin E. Hardy
ATTORNEY Patented Oct. 14, 1941

2,259,305

UNITED STATES PATENT OFFICE 2,259,305

SWITCH OPERATING MECHANISM

Henry S. Gates, Sharon, Pa., assignor to Westinghouse Electric & Manufacturing Company, East Pittsburgh, Pa., a corporation of Pennsylvania Application July 20, 1940, Serial No. 346,557

6 Claims. (Cl. 200—50)

This invention relates to transformer grounding switches and particularly to the operating mechanism for actuating the grounding switches.

In the operation of electrical apparatus, such as transformers, a plurality of transformers may be connected to operate in parallel between a high-voltage network source and a low-voltage distribution network, and it may become necessary to disconnect a transformer from both networks in order to deenergize it when repairs or inspection are made. It is also desirable that means be provided for guarding against the transformer becoming energized during such repair or inspection. To accomplish this, a line switch is usually provided on the low-voltage side of the transformer between it and the distribution circuit and a ground switch is provided at the transformer for interrupting the circuit between the transformer windings and the high voltage supply source, which switch is also arranged to be operated to a ground position to connect the high-voltage feeder to ground. When the transformer is disconnected from the high voltage feeder and the feeder is to be grounded, the circuit breaker energizing the feeder is operated to its circuit interrupting position. This circuit breaker is usually some distance from the transformer such as at the substation or power house supplying the circuit and is not, therefore, under the control of the men working on the transformer so that after the feeder circuit has been deenergized, it is possible that this circuit breaker may again be closed while the switch at the transformer is in its open position. Since serious damage to apparatus and life may result if the grounding switch controlling the transformer is operated from an open position to ground position when the transformer is energized, it is advisable to provide an actuating mechanism for the grounding switch which will necessitate actuating the grounding switch from the open position to the transformer position before actuating it to the ground position. If the feeder circuit should be energized when the switch is moved to the transformer position, thus energizing the transformer, an automatic electric interlocking will be operated to lock the switch mechanism against operation to the ground position.

In a large number of transformer grounding switches commonly employed in the industry, the open position of the switch is between the ground position and the transformer position of the switch. In this type of grounding switch it has been difficult to enforce the desired sequence of operation of the grounding switch or to secure free movement of the switch from the open position to the transformer position and from the transformer position to the open position.

An object of the invention is the provision of an operating mechanism for controlling the sequence of operating positions of a grounding switch.

A more specific object of the invention is the provision of an operating mechanism for effecting a positive movement of a transformer grounding switch from an open position through a transformer position to the ground position, and for preventing a return movement of the grounding switch to the ground position after it has once been advanced from the ground position without first going through a predetermined cycle of operation.

A further object of the invention is the provision of means whereby when the grounding switch is advanced from the open position to the transformer position, and then from the transformer position through open position to the ground position, it will be necessary to stop the mechanism in open position long enough to permit the automatic interlock to operate, to thus prevent further operation of the switch toward ground position if the transformer is energized. To this end a ratchet operating mechanism is provided to prevent operation of the switch to "ground" position until a manually operable release member has been actuated through a first movement while the switch is in the "transformer" position, and a second movement while the switch is in the "open" position to then release the ratchet to permit operation of the switch to the ground position.

Other objects and advantages of the invention will be apparent from the following description of a preferred embodiment thereof when taken with reference to the accompanying drawings, in which:

Fig. 3 is a sectional view taken along the line III—III of Fig. 2;

Fig. 4 is a sectional view taken along the line IV—IV in Fig. 3;

Figs. 5 and 6 are detail views of parts of the apparatus shown in Fig. 4;

Fig. 7 is a section taken on line VII—VII of Fig. 6;

Fig. 8 is an enlargement of a portion of Fig. 4;

Figs. 9, 10 and 11 are sectional views taken along the line IX—IX in Fig. 3 with parts of the apparatus in other positions than in Fig. 4;

Figs. 12 and 13 are detailed views illustrating certain parts of the apparatus; and Fig. 14 is a sectional view taken along line XIV—XIV of Fig. 4.

Figure 1:
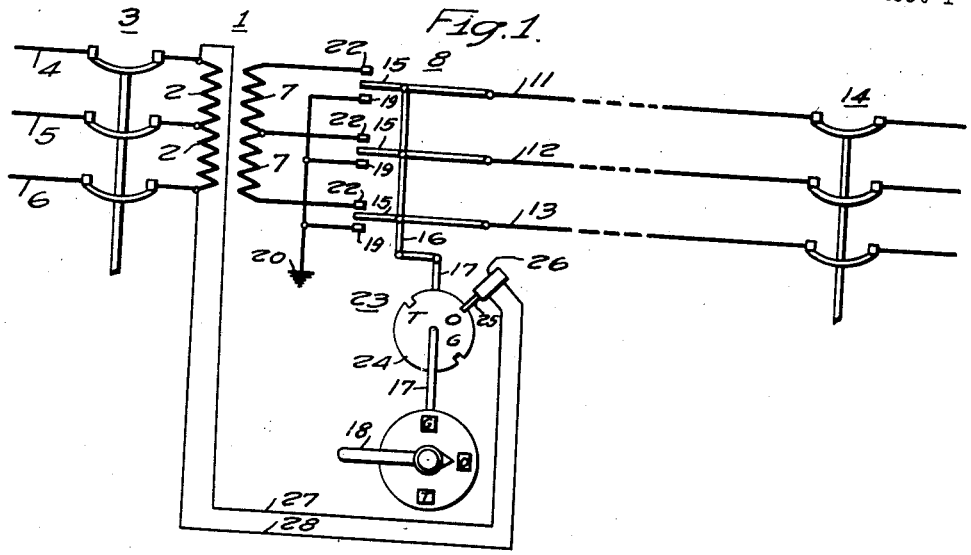
Figure 1 is a diagrammatic view of a three-phase transformer, electrical circuits, and a three-phase grounding switch.
Figure 2:
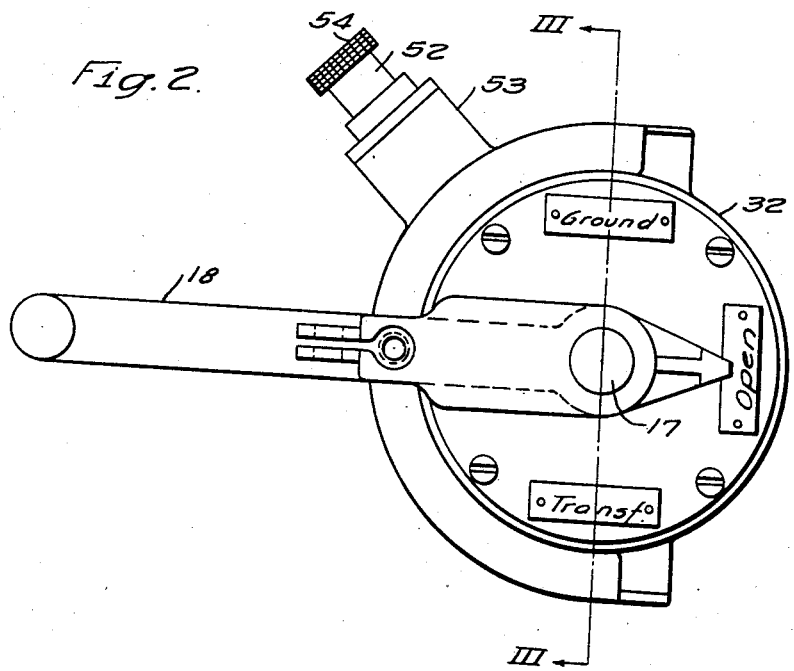
Fig. 2 is an elevational view of the enclosing housing of the operating mechanism embodying the invention.

Referring to the drawings, and particularly to Figs. 1 and 2 thereof, the invention is illustrated as applied to a transformer 1 having low-voltage windings 2, from which current is supplied through a circuit breaker 3 to low-voltage network conductors 4, 5 and 6, and high-voltage windings 7 that are adapted to be connected through the grounding switch 8 to phase conductors 11, 12 and 13 of a high-voltage feeder that is connected to a source of energy through circuit breaker 14. The grounding switch comprises blades 15 connected by suitable operating means 16 to a shaft 17 that is operated by a handle 18 which, when moved in a counter-clockwise direction from the open position shown, causes the blades to engage contact members 19 that are shown connected to ground at 20, thus grounding the feeder comprising conductors 11, 12 and 13. When the shaft 17 is moved in a clockwise direction from the position shown in Fig. 1, the contact blades 15 are moved from open position to engagement with contact members 22, thus connecting the feeder conductors 11, 12 and 13 to the high voltage windings 7 of the transformer. Latching mechanism 23 is provided on the shaft 17 which comprises a disc 24 and a latch 25 operated by a solenoid 26 that is connected by conductors 27 and 28 to be energized from one phase of the low-voltage winding of the transformer when the transformer is energized. The latch 25 is forced to its illustrated position into a notch in the disc 24 which permits operation of the shaft 17 from open to transformer position but prevents operation to ground position when the solenoid 26 is energized.

Referring particularly to Figs. 2, 3, 4 and 14, the switch operating mechanism controlled by the handle 18 is contained within a housing 32 that is attached in any suitable manner to a plate 33 on the housing about the grounding switch. One end of the operating shaft 17 projects through a stuffing box 34 from the switch housing to the operating mechanism.

In order to control the movement of the shaft 17 to actuate the grounding switch through a predetermined sequence of switching operations, a ratchet member 35 is fixed to the shaft 17 by a key 36, and is provided with a portion comprising an arcuate stop 37 and a portion having teeth 38 for engaging a latch member 39 pivotally mounted on the pin 42 that is mounted on a projection 43 extending downwardly from the upper wall of the housing. A spring 44 is provided between the housing and the latch 39 for forcing the tooth 45 on the latch downwardly into engagement with the teeth 38 on the ratchet member.

A lever 46 is mounted on shaft 17 as a bearing so as to move freely with respect to the shaft, and provided at its outer end with a stop portion 47 bent at right angles to the radial portion of the lever for a purpose to be later explained. A spring 48 is provided, one end of which is attached to the housing casing and the other end of which is attached to the lever 46 for biasing the lever in a counter-clockwise direction, as illustrated in Fig. 4, against a projection 49 on the housing which limits its motion in a counter-clockwise direction.

In order to operate the latch 39 from the position illustrated in Fig. 4 to permit movement of the ratchet member 35 in a counter-clockwise direction from open to ground position of the grounding switch, bolt 52 is provided extending through a projected portion 53 of the housing upon the upper end of which button 54 is positioned for forcing the bolt downwardly against the bias of a spring 55 provided within a cavity 56 and one end of which engages a washer 57 at the lower end of the cavity, the upper end of which engages a shoulder 58 on the button 54. The spring 55 acts to bias the bolt 52 outwardly to the position illustrated in Figs. 4 and 8, in which position a flange 59 on the lower end of the portion 54, and which centers it within the bore in the casing portion 53, engages a ring 60 attached to the outer end of the portion 53 for limiting the outward motion of the button 54.

As best shown in Figs. 12 and 13, the lower end of the bolt 52 is cut away to provide a flat surface 61 and a pin 62 for purposes to be explained.

From the foregoing disclosure, it is evident that when the operating mechanism is in the position shown in Figs. 3, 4 and 14, corresponding to "open" position of the switch, the stop 37 carried on the ratchet member 35 and the stop 47 carried by the lever 46 are both between the end of the bolt 52 and the tail portion of the latch 39 so that the latch cannot be released from engagement with the ratchet teeth 38. The switch may be freely operated from the open position to the transformer position and back again, the ratchet 35 moving from the position shown in Fig. 4 to that shown in Fig. 9 undisturbed by the latch 39. As previously explained, it is necessary to move the shaft 17 from open position as shown in Fig. 4 to transformer position as shown in Fig. 9 before it can be operated to switch grounding position. When the shaft is so moved, the shoulder 71 on the ratchet member 35 engages a shoulder 72 on the lever 46 after the shaft has been moved through nearly 90°, and, after engagement of these two shoulders, the lever 46 is moved against the bias of spring 48 to the position shown in Fig. 9, during which movement the stop 47 is moved from between the end of the bolt 52 and the tail of the latch 39. In this position of the ratchet 35, a portion of the arcuate stop 37 is between the end of the bolt 52 and the tail of the latch 39. If the bolt is positioned so that the arrow has the direction shown in Fig. 5, and the bolt has the position shown in Figs. 4 and 14, the flat surface 61 is parallel to the inner side of a flange 73 extending outwardly from one edge of the stop 37. The bolt 52 may now be pressed downwardly a distance sufficient to cause the pin 62 to engage the shoulder 74, best shown in Figs. 11 and 12. The bolt 52 is shown in this position in Fig. 7, and it will be noted by reference to Figs. 7 and 8 that the bolt 52 is in this position while the shaft 17 is operated in a counter-clockwise direction from transformer position (Fig. 9) to open position (Fig. 10). The bolt 52 will prevent the stop 47 from being positioned between the bolt 52 and the tail of the latch 39.

When it is desired to move the switch to ground position, the shaft 17 is first moved to transformer position and the bolt 52 is depressed as just above described, and the shaft then again moved to open position, in which position the ratchet 35 will be in the position shown in Fig. 8. During movement of the shaft 17 from the position shown in Fig. 9 to the position shown in Fig. 10, the arcuate flange stop 37 carried by the ratchet member 35 will have passed beyond the end of the bolt 52 so that neither the stop 47 nor the stop 37 is between the end of the bolt 52 and the tail of the latch 39. However, it is desired that the switch be held in the open position for a moment before being advanced to the ground position, in order to provide time for the latch 25 of the electric interlock to enter the notch provided in the disc 24 to prevent further operation of the switch if the transformer is energized.

In order to accomplish this result, provision is made whereby it is necessary to turn the bolt through a 90° arc from the position shown in Fig. 5 before the bolt can be advanced downwardly to disengage the latch 39 from the ratchet 35. The means for requiring this movement consists of the pin 62, previously mentioned, as extending through the bolt which upon downward movement of the bolt 52 through its first step of motion engages a shoulder 74 in the housing portion 53 as shown in Figs. 4, 6, 7 and 8. When, however, the bolt 52 is turned 90° in a counter-clockwise direction from the position shown in Fig. 5, the pin 62 moves from the position shown in Fig. 9 to the position shown in Fig. 10 just above a slot 75 provided in the housing for the pin 62 through which it may slide as the bolt is advanced downwardly to disengage the latch, thus permitting the shaft 17 to be operated another 90° in a counter-clockwise direction to the grounding switch position, shown in Fig. 11.

The bolt may now be released and will be forced outwardly by the spring 55, the stop 47 being returned to the position shown in Fig. 4. Should the switch be moved away from ground position, the teeth 38 on the ratchet member 35 will engage the tooth 45 on the latch 39 to prevent the return of the shaft 17 to ground position of the switch until the complete sequence of operation above described is followed through again.

To summarize the operation necessary to advance the switch from open to ground position, it is necessary to move the handle 18 and shaft 17 90° in a clockwise direction from the open position, illustrated in Fig. 2, to transformer position, thus moving the several parts of the mechanism from the positions illustrated in Fig. 4 to the positions illustrated in Fig. 9, and with the handle in transformer position, to press the bolt 52 with the arrow in the direction shown in Fig. 5 through a first movement as limited by pin 62 and shoulder 74 so that the end of the bolt will be in a position to prevent the stop 47 from being again positioned between the bolt and the latch when the shaft is again moved in a counter-clockwise direction. The handle 18 and the shaft 17 are then moved from transformer position in a counter-clockwise direction back to open position and the bolt 52 given a 90° turn to permit the pin 62 to slide in the slot 75 after which the bolt is depressed through its second movement to unlock the latch 39 and permit a completion of the movement of the shaft 17 and the handle 18 through another 90° to ground position.

Modifications in the apparatus illustrated and described will occur to those skilled in the art within the spirit of my invention, and I do not wish to be limited otherwise than by the scope of the appended claims.

I claim as my invention:

1. In an operating mechanism for effecting the movement of a transformer grounding switch between an open position, a transformer position, and a ground position, in combination, a housing for the operating mechanism, a shaft rotatably mounted in the housing for actuating the switch, a ratchet wheel carried by the shaft, a pawl associated with the ratchet wheel and arranged to permit free movement of the switch between open and transformer positions while preventing movement from open to ground position, means disposed for manual operation to actuate the pawl to release the ratchet wheel when the switch is in open position and permit movement of the shaft to actuate the switch to the ground position, and means for preventing the manual operation of the pawl actuating means for effecting the release of the ratchet wheel unless the shaft is first moved to transformer position.

2. In an operating mechanism for effecting the movement of a transformer grounding switch between an open position, a transformer position, and a ground position, in combination, a housing for the operating mechanism, a shaft rotatably mounted in the housing for actuating the switch, a ratchet wheel carried by the shaft, a pawl associated with the ratchet wheel and arranged to permit free movement of the switch between open and transformer positions while preventing movement from open to ground position, spring means associated with the pawl and disposed to bias the pawl to engage the ratchet wheel, spring biased means disposed for manual operation to actuate the pawl to release the ratchet wheel and permit movement of the shaft to actuate the switch to the ground position, and means for preventing the manual operation of the pawl actuating means for effecting the release of the ratchet wheel unless the shaft is first moved to actuate the switch to transformer position.

3. In an operating mechanism for effecting the movement of a transformer grounding switch between an open position, a transformer position, and a ground position, in combination, a housing for the operating mechanism, a shaft rotatably mounted in the housing for actuating the switch, a ratchet wheel carried by the shaft, a pawl associated with the ratchet wheel and arranged to permit free movement of the switch between open and transformer positions while preventing movement from open to ground position, spring means associated with the pawl and disposed to bias the pawl to engage the ratchet wheel, spring biased means disposed for manual operation to actuate the pawl to release the ratchet wheel and permit movement of the shaft to actuate the switch to the ground position, said manually operable means being operable in two movements, the first movement being permitted only when the shaft is in a position corresponding to transformer position of the switch and the second movement being permitted only when the shaft is in a position corresponding to open position of the switch after the first movement has been effected and maintained during operation of the shaft from transformer position to open position.

4. In an operating mechanism for effecting the movement of a transformer grounding switch between an open position, a transformer position, and a ground position, in combination, a housing for the operating mechanism, a shaft rotatably mounted in the housing for actuating the switch, a ratchet wheel carried by the shaft, a pawl associated with the ratchet wheel and arranged to permit free movement of the switch between open and transformer positions while preventing movement from open to ground position, spring means associated with the pawl and disposed to bias the pawl to engage the ratchet wheel, spring biased means disposed for manual operation to actuate the pawl to release the ratchet wheel and permit movement of the shaft to actuate the switch to the ground position, said manually operable means being operable in two movements, and means for preventing the first movement of the pawl actuating means unless the shaft is in transformer position, and means for preventing the second movement of the pawl actuating means for actuating the pawl to release the ratchet.

5. In an operating mechanism for effecting the movement of a transformer grounding switch between an open position, a transformer position, and a ground position, in combination, a housing for the operating mechanism, a shaft rotatably mounted in the housing for actuating the switch, a ratchet wheel carried by the shaft, a pawl associated with the ratchet wheel and arranged to permit free movement of the switch between open and transformer positions while preventing movement from open to ground position, spring means associated with the pawl and disposed to bias the pawl to engage the ratchet wheel, spring biased means disposed for manual operation to actuate the pawl to release the ratchet wheel and permit movement of the shaft to actuate the switch to the ground position, and two stop means normally positioned between said pawl and said pawl actuating means when the shaft is moved from open position toward transformer position, means operable upon movement of the shaft from the switch open position to transformer position for moving one of said stops from between said pawl actuating means and said pawl to permit a first motion of said pawl actuating means inwardly toward said pawl and when so held manually during movement of the shaft from transformer position to open position to prevent return of said stop to its normal position, said second stop being movable with said shaft and occupying a position when the shaft is in the switch open position for permitting a second inward movement of said pawl actuating means to release the pawl from engagement with the ratchet wheel to permit movement of the shaft from the switch open position to the ground position.

6. In an operating mechanism for effecting the movement of a transformer grounding switch between an open position, a transformer position, and a ground position, in combination, a housing for the operating mechanism, a shaft rotatably mounted in the housing for actuating the switch, a ratchet wheel carried by the shaft, a pawl associated with the ratchet wheel and arranged to permit free movement of the switch between open and transformer positions while preventing movement from open to ground position, spring means associated with the pawl and disposed to bias the pawl to engage the ratchet wheel, spring biased means disposed for manual operation to actuate the pawl to release the ratchet wheel and permit movement of the shaft to actuate the switch to the ground position, and two stop means normally positioned between said pawl and said pawl actuating means when the shaft is moved from open position toward transformer position, means operable upon movement of the shaft from the switch open position to transformer position for moving one of said stops from between said pawl actuating means and said pawl to permit a first motion of said pawl actuating means inwardly toward said pawl and when so held manually during movement of the shaft from transformer position to open position to prevent return of said stop to its normal position, said second stop comprising an arcuate member movable with said shaft and occupying a position when the shaft is in the switch open position for permitting a second inward movement of said pawl actuating means to release the pawl from engagement with the ratchet wheel to permit movement of the shaft from the switch open position to transformer position, and means requiring movement of said pawl actuating means about its axis a predetermined amount between said first inward movement and said second inward movement.

HENRY S. GATES.